United States Patent Office 3,349,136
Patented Oct. 24, 1967

3,349,136
2-BROMO-2-CHLORO-1,1-DIFLUOROCYCLO-
PROPANE
Max M. Boudakian and George H. Hofmann, Hamden,
Conn., assignors to Olin Mathieson Chemical Corporation, New Haven, Conn., a corporation of Virginia
No Drawing. Filed Sept. 15, 1965, Ser. No. 487,618
1 Claim. (Cl. 260—648)

ABSTRACT OF THE DISCLOSURE 2-bromo-2-chloro-1,1-difluorocycloproprane is provided in good yield and high purity by the reaction of vinylidene fluoride with phenyl dibromochloromethyl mercury.

This invention relates to the preparation of a novel heterohalogenated cyclopropane. More specifically it relates to 2-bromo-2-chloro-1,1-difluorocyclopropane, a valuable agricultural chemical.

It has been found that the aforementioned substituted cyclopropane is provided in good yield and high purity by the reaction of vinylidene fluoride with phenyl dibromochloromethyl mercury under selected conditions. The preparation disclosed herein proceeds in accordance with the following equation:

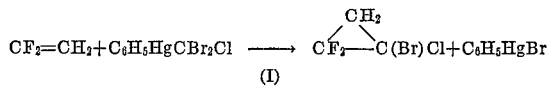

(I)

Essentially the reaction involves the addition of bromochlorocarbene to vinylidene fluoride. The carbene precursor, i.e., the phenyl dibromochloromethyl mercury, is available by the reaction of dibromochloromethane and phenyl mercuric chloride in the presence of potassium t-butoxide in a benzene solution as for example disclosed by D. Seyferth et al. in J. Am. Chem. Soc., 84, 1757 (1962).

The reaction of the phenyl dibromochloromethyl mercury with the vinylidene fluoride must be carried out in a sealed reaction vessel at a temperature of at least 75° C. in order to provide the desired substituted cyclopropane. Attempts to provide the derivative I without employing a sealed container have been unsuccessful. For instance, a five-fold excess of vinylidene fluoride was passed through a solution of phenyl dibromochloromethyl mercury in chlorobenzene over a period of twenty hours at a temperature range of 51°–81° C. without providing any of the desired compound I even though a precipitate of $C_6H_5HgBr$ was obtained.

Preferably the reaction is performed at a temperature range of 75°–150° C. although higher temperatures may be utilized. The reaction can be carried out in the absence of a diluting medium, but it is preferred to employ an inert diluent in the preparation. Among the suitable diluents which may be used are benzene, halogenated benzenes such as the mono- and di-chlorobenzenes and bromobenzenes, alkylated benzenes including toluene and the various xylenes, aliphatic hydrocarbons such as hexane, heptane and the like.

Thus the preferred process described herein comprises adding at least a stoichiometric amount of vinylidene fluoride to a reaction vessel containing the mercury derivative and an inert diluent, and heating the reaction mixture in the sealed reaction vessel at a temperature of at least 75° C. There is no necessity of applying external pressure to the equipment, but autogenous pressure does develop during the run. After the reaction period, workup is conveniently carried out by venting the sealed vessel at room temperature to remove volatiles. The insoluble phenyl mercuric bromide is removed from the reaction mixture by procedures such as filtration, centrifugation, etc., and the remaining liquid material is conveniently distilled to provide the desired product.

As mentioned in the preceding discussion, 2-bromo-2-chloro-1,1-difluorocyclopropane is a valuable agricultural chemical since it is an effective pesticide. For instance, it is a useful nematocide having demonstrated utility against the root knot nematode, a plant parasite which is particularly damaging to several vegetable crops. However the derivative I has shown particularly valuable activity as a fumigant. It is unusually potent as a fumigant in killing the confused flour beetle, *Tribolium confusum*, which is especially damaging to flour which is in storage. It has been found that very small concentrations of 2-bromo-2-chloro-1,1-difluorocyclopropane nearly completely kill this species of beetle. For example, a concentration of only 0.02 part per million of the derivative I in stored flour has been found to kill over 96% of the beetles commonly found in such flour.

The following example will serve to illustrate the preparation of 2-bromo-2-chloro-1,1-difluorocyclopropane in accordance with the process described herein.

EXAMPLE 1

A 1.8 liter stainless steel rocking autoclave was charged with 255 g. (0.526 mole) of phenyl dibromochloromethyl mercury and 750 ml. of o-dichlorobenzene. The reaction mixture was then saturated with vinylidene fluoride (0.526 mole minimum), and the sealed pressure vessel was heated to 86°–92° C. (650–700 p.s.i.g.) for 24 hours. The reaction mixture was cooled to 0° C., and volatiles were vented through a —78° C. trap. The autoclave contents were filtered to provide 160 g. (0.45 mole) of phenylmercuric bromide, M.P. 270°–275° C. This represents 85.5% conversion of $C_6H_5HgC(Br)_2Cl$ to $C_6H_5HgBr$.

The filtrate was distilled to provide a total of 161 g. of distillate (70° to 175° C.). Vapor phase chromatography analysis indicated that this material contained 34.1% of 2-bromo-2-chloro-1,1-difluorocyclopropane which represents an analytical yield of 55%. Redistillation of the distillate through a 10 inch glass-helix packed column provided 33.3 g. of products, B.P. 86°–87° C., $n_D^{25}$ 1.4270 (33% in-hand yield). Product purity by vapor phase chromatographic analysis was 99.2%. Mass spectral analysis showed a molecular weight ion peak at m/e 190 with isotope peaks at m/e 192 and m/e 194. Nuclear magnetic resonance $F^{19}$ spectral analysis revealed that the product contained two fluorine atoms on a carbon ($C_1$) which was attached to a second ($C_2$) bonded to two protons. This spectrum also indicated that a third carbon ($C_3$) atom was present which had two unlike atoms or groups attached to it and which was bonded to $C_1$. Nuclear magnetic resonance $H^1$ spectral analysis also revealed a multiplet of peaks in the range expected for a three-membered ring.

What is claimed is:
2-bromo-2-chloro-1,1-difluorocyclopropane.

References Cited

UNITED STATES PATENTS 3,265,745  8/1966  Seyferth et al. _____ 260—648

OTHER REFERENCES

Stevens: J. Am. Chem. Soc., vol. 68, pp. 620 to 22 (1946).

LEON ZITVER, *Primary Examiner*.
BERNARD HELFIN, *Examiner*.
M. JACOB, *Assistant Examiner*.